(12) United States Patent
Nakayama et al.

(10) Patent No.: US 7,765,090 B2
(45) Date of Patent: Jul. 27, 2010

(54) APPARATUS AND METHOD FOR IDENTIFICATION OF SWIRLING FLOW

(75) Inventors: Katsuyuki Nakayama, Hyogo (JP); Kenji Umeda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 776 days.

(21) Appl. No.: 11/568,220

(22) PCT Filed: Apr. 25, 2005

(86) PCT No.: PCT/JP2005/007778

§ 371 (c)(1),
(2), (4) Date: Apr. 11, 2007

(87) PCT Pub. No.: WO2005/103995

PCT Pub. Date: Nov. 3, 2005

(65) Prior Publication Data

US 2007/0294066 A1    Dec. 20, 2007

(30) Foreign Application Priority Data

Apr. 23, 2004  (JP) ............................. 2004-128952

(51) Int. Cl.
  *G06F 7/60*   (2006.01)
  *G06F 17/10*  (2006.01)
(52) U.S. Cl. ............................................. 703/9; 703/2

(58) Field of Classification Search ...................... 703/9; 702/9, 2; 123/262
See application file for complete search history.

(56) References Cited

U.S. PATENT DOCUMENTS 5,877,777 A * 3/1999 Colwell ....................... 345/473

OTHER PUBLICATIONS

Ming Jiang, Raghu Machiraju, David Thompson, "Geometric Verification of Swirling Features in Flow Fields" IEEE Visualization 2002, Oct. 27-Nov. 1, 2002, Boston, MA, USA, 0-7803-7498-3/02/ $17.00© 2002 IEEE, pp. 307-314.*

(Continued)

*Primary Examiner*—Dwin M Craig
(74) *Attorney, Agent, or Firm*—Westerman, Hattori, Daniels & Adrian, LLP (57) ABSTRACT

A swirling flow identification apparatus includes an eigenequation calculation section 3 and a swirl axis calculation section 4. The eigenequation calculation section 3, based on velocity data of a fluid at a coordinate point, calculates an eigenvalue through an eigenequation concerning the coordinate point and the velocity data. The swirl axis calculation section 4, if the eigenvalue is a complex number, defines an imaginary part of the complex number as a swirl function, calculates a coordinate point providing a local maximum value in the swirl function and defines the coordinate point providing the local maximum value as the position of a swirling axis of a swirling flow in the fluid. With this, even under the presence of another flow or a plurality of swirling flow, the swirling flow can be adequately identified by using the velocity vector at each of node points (coordinate points).

16 Claims, 9 Drawing Sheets

OTHER PUBLICATIONS

C. H. Berdahl et al.; "Eduction of Swirling Structure using the Velocity Gradient Tensor", AIAA 22nd Fluid Dynamics, Plasma Dynamics & Laser Conference, Jun. 24-26, 1991, AIAA 91-1823. Cited in the int'l. search report.

R. Cucitore et al.; "On the effectiveness and limitations of local criteria for the identification of a vortex", European Journal of Mechanics—B/Fluids, vol. 18, No. 2, pp. 261-282, 1999. Cited in the int'l. search report.

A. Nakayama et al.; "Sokudo Kobai Tensor to 3 Jigen Nagare no Kyokushoteki Keitai no Tokusei", Kobe Daigaku Daigakuin Kagaku Kenkyuka Kiyo, 2001, 19-B, pp. 69-75. Cited in the int'l. search report.

K. Nakayama et al.; "Application of identification method of swirling motion by swirl function", ICONE 12-49184, 12th Int'l. Conference on Nuclear Engineering, Apr. 25-29, 2004.

K. Nakayama et al.; "Visualization system of swirl motion", Icone 12-49189, 12th Int'l. Conference on Nuclear Engineering, Apr. 25-29, 2004.

D. Sujudi et al.; "Identification of swirling flow in 3-D vector fields", Department of Aeronautics and Astronautics, Massachusetts Institute of Technology, pp. 1-8.

R. Strawn et al.; "Computer Visualizaton of vortex Wake Systems", AIAA Journal, vol. 37, No. 4, Technical Notes, pp. 511-512.

S. Kida et al.; "Identification and analysis of vortical structures", European Journal of Mechanics—B/Fluids, vol. 17, No. 4, pp. 271-288, 1998.

International Search Report of PCT/JP2005/007778, date of mailing Aug. 16, 2005.

* cited by examiner

LATERAL DIRECTION FLOW L

APPARATUS AND METHOD FOR IDENTIFICATION OF SWIRLING FLOW

TECHNICAL FIELD

The present invention relates to an apparatus and a method for identification of swirling flow, and particularly, to an apparatus and a method for identification of swirling flow in fluid flow.

BACKGROUND ART

Figure 1:
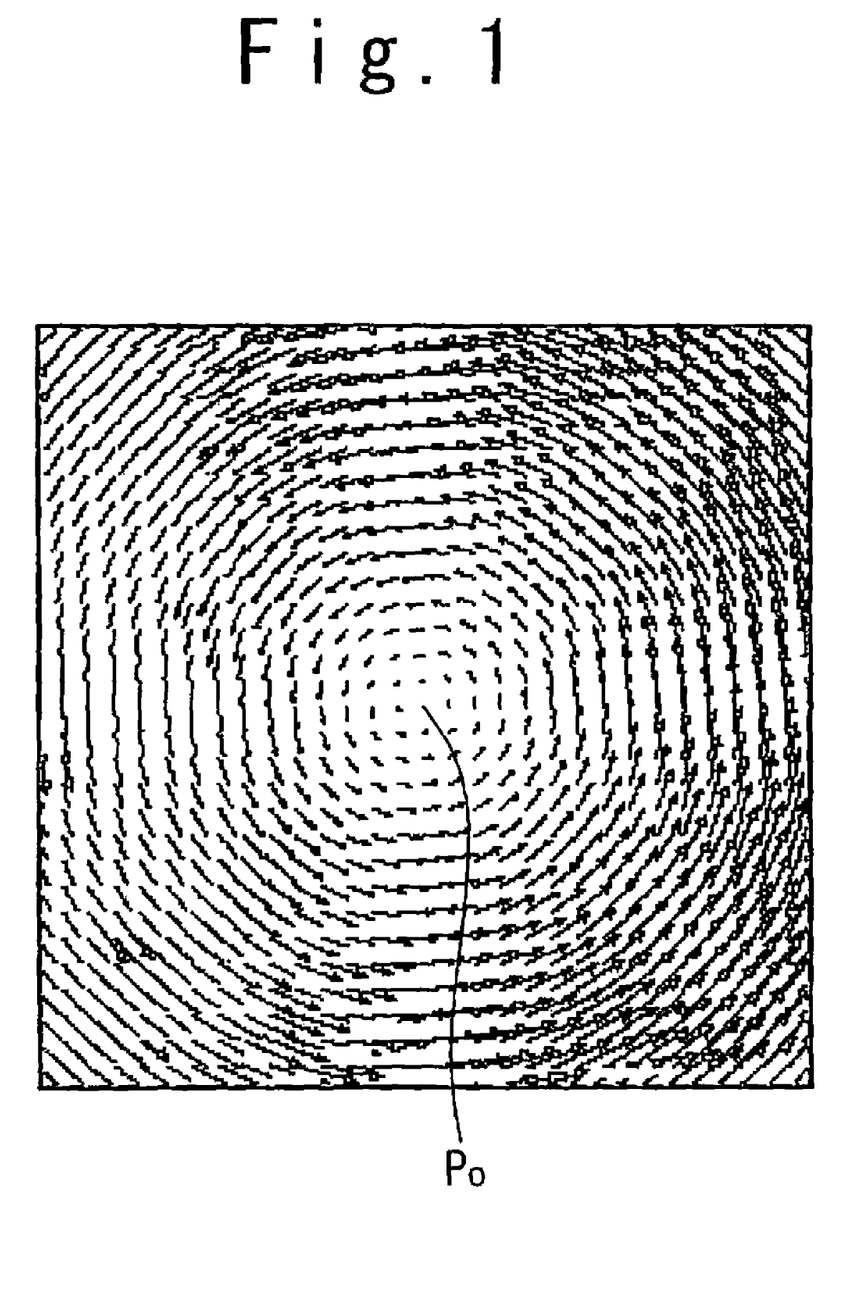
FIG. 1 is a diagram showing one example of a fluid flow in a state in which only a swirling flow exists.

A swirling flow is known as a fluid flow. FIG. 1 shows one example of a fluid flow in a state in which only a swirling flow exists. FIG. 1 shows a velocity vector at each of a plurality of node points (coordinate points) on one of swirling planes (planes normal to the swirling axis of the swirling flow) of the swirling flow. The direction and length of each arrow indicate the direction and magnitude of each velocity vector, respectively. As shown in FIG. 1, in the swirling flow, the fluid swirls around the swirling axis P0 as the center.

Figure 2:
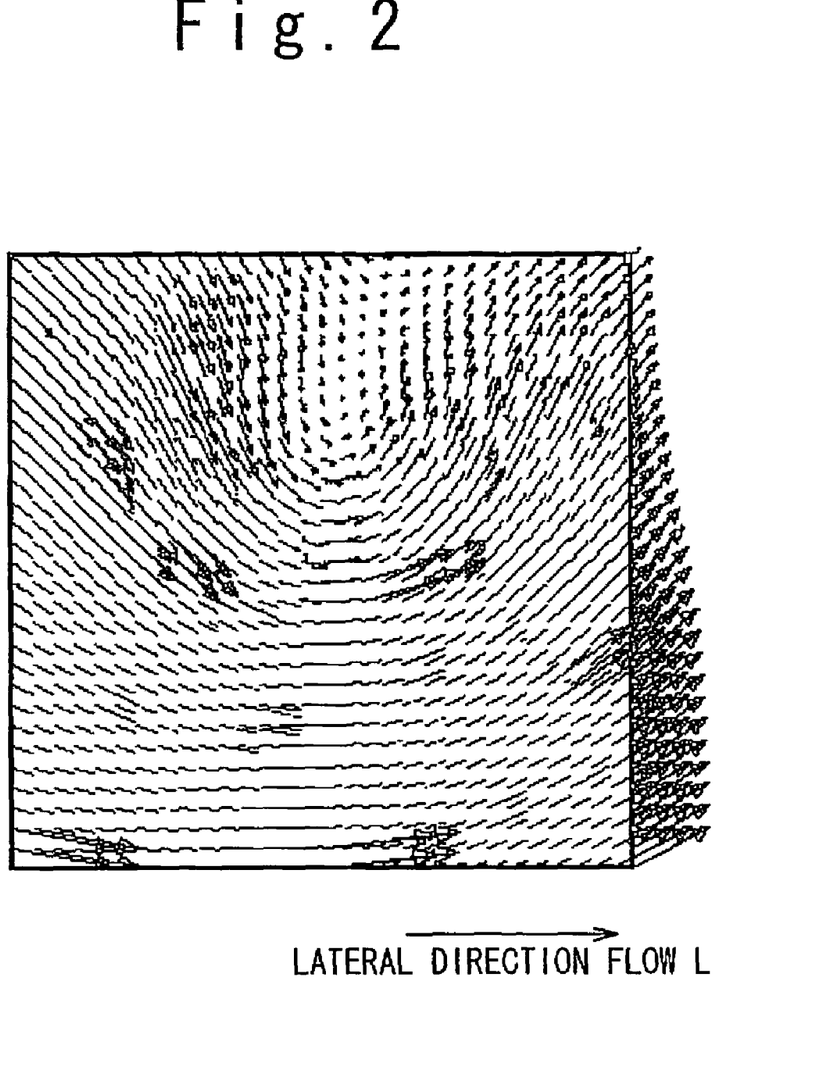
FIG. 2 is a diagram showing one example of a fluid flow in a state in which a uniform flow is superimposed on the swirling flow.

FIG. 2 shows one example of a fluid flow in a state in which a uniform flow is superimposed on the swirling flow. FIG. 2 shows a velocity vector at each of a plurality of node points (coordinate points) in a case where the uniform flow, which flows in the lateral direction from the left side to the right side of the figure, is superimposed on the swirling flow shown in FIG. 1. As shown in FIG. 2, the presence of the uniform flow besides the swirling flow results in failure to visually identify the presence of the swirling flow.

There has been a demand for a technique capable of adequately identifying the swirling flow by using a velocity vector at each node point (coordinate point). There has been a demand for a technique capable of, even under the presence of another flow, adequately identifying the swirling flow. There has been a demand for a technique capable of, even under the presence of another flow and a plurality of swirling flows, adequately identifying these swirling flows.

As a related art, D. Sujudi and R. Haimes disclosed a method for identification of swirling flow in "Identification of swirling flow in 3-D vector fields" (12th AIAA Comput Fluid Dyn conf 1995 Part2, (1995), p. 792-799). With this method, at first, an eigenvalue of a velocity gradient tensor are calculated. Next, if the eigenvalue is a complex number, a coordinate point on a swirling plane, where the velocity is 0 around the coordinate point, is searched for. The coordinate point where the velocity is 0 is defined as the position of a swirling axis. However, with this method, it is difficult to obtain the swirling axis under the presence of a uniform flow.

Moreover, R. C. Strawn, D. N. Kenwright, and J. Ahmad disclosed another method for identification of swirling flow in "Computer visualization of Vortex Wake System", (AIAA (1999), vol. 7 (No. 4), p. 511-512). With this method, a vorticity $\omega$ is calculated. Then, a coordinate point indicating a local maximum of the vorticity $\omega$ is defined as the position of a swirling axis. Note that the vorticity $\omega$ represents (the twice of) an angular velocity in arbitrary pattern of flow which is not limited to a swirling flow. Thus, a flow having the vorticity $\omega$ not necessarily is a swirling flow. That is, having the vorticity $\omega$ is not a sufficient condition for being a swirling flow.

Furthermore, S. Kida and H. Miura disclosed still another method for identification of swirling flow in "Identification and analysis of vortical structure", (E. J. Mech. B/Fluids, (1998), vol. 17 (No. 4), p 471-488). With this method, a swirling axis is obtained based on the Hessian of pressure, a vorticity and a velocity gradient tensor. However, not only velocity data but also pressure data is required, and the calculation is complicated. It is difficult to acquire pressure data at the necessary and sufficient number of coordinate points required for the analysis to obtain the swirling axis based on experimental data.

DISCLOSURE OF INVENTION

Accordingly, it is an object of the present invention to provide an apparatus and a method for identification of swirling flow capable of adequately identifying a swirling flow by using a velocity vector at each node point (coordinate point).

It is another object of the present invention to provide an apparatus and a method for identification of swirling flow capable of adequately identifying a swirling flow even under presence of another flow or a plurality of swirling flows.

It is further another object of the present invention to provide an apparatus and a method for identification of swirling flow capable of adequately deciding the presence or absence of swirling flow.

It is still further another object of the present invention to provide an apparatus and a method for identification of swirling flow capable of discriminating between a swirling flow having a swirling axis (vortex axis) and a swirling flow not having a swirling axis.

According to one aspect of the present invention, a swirling flow identification apparatus of the present invention includes an eigenequation calculation section and a swirling axis calculation section. The eigenequation calculation section, based on velocity data V of a fluid at a coordinate point X, calculates an eigenvalue $\lambda$ through an eigenequation concerning the coordinate point X and the velocity data V. The swirling axis calculation section, if the eigenvalue $\lambda$ is a complex number $\lambda_R \pm i\phi$, defines an imaginary part $\phi$ of the complex number $\lambda_R \pm i\phi$ as a swirl function $\phi$, calculates a coordinate point $X_0$ providing a local maximum value in the swirl function $\phi$, and defines the coordinate point $X_0$ providing the local maximum value $\phi_0$ as the position of a swirling axis P of a swirling flow in the fluid.

Here, based on the velocity data V at the coordinate point X, a Taylor expansion of the velocity is performed in a moving coordinate system which moves at the velocity of the coordinate point X which is the object of analysis, and then second and higher order terms are ignored to thereby obtain a velocity gradient tensor, and the eigenequation thereof is used.

The swirling flow identification apparatus described above has the swirling axis calculation section 4 which calculates the local maximum value $\phi_0$ in the swirl function $\phi$ and defines the local maximum value $\phi_0$ as an angular velocity at the swirling axis P.

The swirling flow identification apparatus described above further includes: a swirling line calculation section which, based on an eigenvector $\xi$ and the swirl function $\phi$ calculated by the eigenequation, calculates a swirling line S indicating the swirling flow; and a display section which displays the swirling line S.

The swirling flow identification apparatus described above has the swirling axis calculation section which further decides that the fluid has no swirling flow if the eigenvalue $\lambda$ is not a complex number $\lambda_R \pm i\phi$.

The swirling flow identification apparatus described above has the swirling axis calculation section which further decides that a clear swirling axis P does not exists if there is no local maximum value $\phi_0$ satisfying a predetermined condition. The absence of the clear swirling axis means that the swirling flow has no axis at the center thereof but swirls around a finite region.

Moreover, according to another aspect, a fluid simulation apparatus includes: an analysis apparatus which, based on input of data related to the fluid, calculates velocity data at each of a plurality of coordinate points indicating the position in the fluid; and one of the swirling flow identification apparatuses described above.

Moreover, according to further another aspect, a swirling flow identification method of the present invention is executed by a swirling flow identification apparatus including an eigenequation calculation section and a swirling axis calculation section. There are included the steps: (a) in which the eigenequation calculation section, based on velocity data V of a fluid at a coordinate point X outputted from a communication line or a storage unit, calculates an eigenvalue λ through an eigenequation concerning the coordinate point X and the velocity data V; and (b) in which the swirling axis calculation section, if the eigenvalue λ is a complex number $\lambda_R \pm i\phi$, defines an imaginary part $\phi$ of the complex number $\lambda_R \pm i\phi$ as a swirl function $\phi$, calculates a coordinate point $X_0$ providing a local maximum value $\phi_0$ in the swirl function $\phi$, and defines the coordinate point $X_0$ providing the local maximum value $\phi_0$ as the position of a swirling axis S of a swirling flow in the fluid.

In the swirling flow identification method described above, there is further included step (c) in which the swirling axis calculation section calculates the local maximum value $\phi_0$ in the swirl function $\phi$, and defines the local maximum value $\phi_0$ as an angular velocity at the swirling axis P.

The swirling flow identification method described above, further includes steps: (d) in which, based on an eigenvector ξ and the swirl function $\phi$ calculated through the eigenequation, a swirling line S indicating the swirling flow is calculated; and (e) in which the swirling line S is displayed.

Moreover, according to still further another aspect, a computer program of the present invention is executed by a swirling flow identification apparatus including an eigenequation calculation section and a swirling axis calculation section. There are included steps: (a) in which the eigenequation calculation section, based on velocity data V of a fluid at a coordinate point X outputted from a communication line or a storage unit, calculates a eigenvalue λ through a eigenequation concerning the coordinate point X and the velocity data V; and (b) in which the swirling axis calculation section, if the eigenvalue λ is a complex number $\lambda_R \pm i\phi$, defines an imaginary part $\phi$ of the complex number $\lambda_R \pm i\phi$ as a swirl function $\phi$, calculates a coordinate point $X_0$ providing a local maximum value $\phi_0$ in the swirl function $\phi$, and defines the coordinate point $X_0$ providing the local maximum value $\phi_0$ as the position of a swirling axis P of a swirling flow in the fluid.

In the computer program described above, a plurality of coordinate points Xs may be used. The step (a) includes step (a1) in which the eigenequation calculation section, based on the coordinate point X and the velocity data V, calculates an eigenvalue λ through an eigenequation concerning the coordinate point X and the velocity data V for each of the plurality of coordinate points Xs. The step (b) includes: step (b1) in which the swirling axis calculation section, for each of the plurality of coordinate points Xs, if the eigenvalue λ is a complex number $\lambda_R \pm i\phi$, defines an imaginary part $\phi$ of the complex number $\lambda_R \pm i\phi$ as a swirl function $\phi$, calculates a coordinate point $X_0$ providing a local maximum value $\phi_0$ in the swirl function $\phi$; and step (b2) in which, if there are a plurality of coordinate points $X_0$s each of which provides a local maximum value $\phi_0$, each of the plurality of coordinate points $X_0$s providing the local maximum value $\phi_0$ is defined as the position of a swirling axis P of a swirling flow in the fluid.

In the computer program described above, there is further included step (c) in which the swirling axis calculation section 4 calculates the local maximum value $\phi_0$ in the swirl function $\phi$, and defines the local maximum value $\phi_0$ as an angular velocity at the swirling axis (p).

In the computer program described above, there are further included: step (d) in which, based on an eigenvector ξ and the swirl function $\phi$ calculated through the eigenequation, a swirling line S indicating the swirling flow is calculated; and step (e) in which the swirling line S is displayed.

In the computer program described above, the step (b) includes step (b3) in which, if the eigenvalue λ is not a complex number $\lambda_R \pm i\phi$, the swirling axis calculation section decide that the fluid has no swirling flow.

In the computer program described above, the step (b) includes step (b4) in which, if there is no local maximum value $\phi_0$ satisfying a predetermined condition, the swirling axis calculation section 4 decides that the fluid has no clear swirling axis P.

To solve the problem described above, the computer program of the present invention is a computer program to be executed by a simulation apparatus including an analysis apparatus and the swirling flow identification apparatus. The simulation apparatus is caused to execute a fluid simulation method including: step (f) in which the analysis apparatus, based on input of data related to a fluid, calculates the velocity data V at the coordinate point X indicating the position in the fluid, and step (g) in which the swirling flow identification apparatus 1 executes the computer program described in any one of the sections provided above.

According to the present invention, even under the presence of another flow or a plurality of swirling flows, a swirling flow can be adequately identified by using the velocity vector at each of node points (coordinate points). The presence or absence of the swirling flow, the presence or absence of the swirling flow having a swirling axis (vortex axis) can be decided adequately.

BEST MODE FOR CARRYING OUT THE INVENTION

Hereinafter, an embodiment of a swirling flow identification apparatus and a swirling flow identification method of the present invention will be described in detail, referring to the accompanying drawings.

Figure 3:
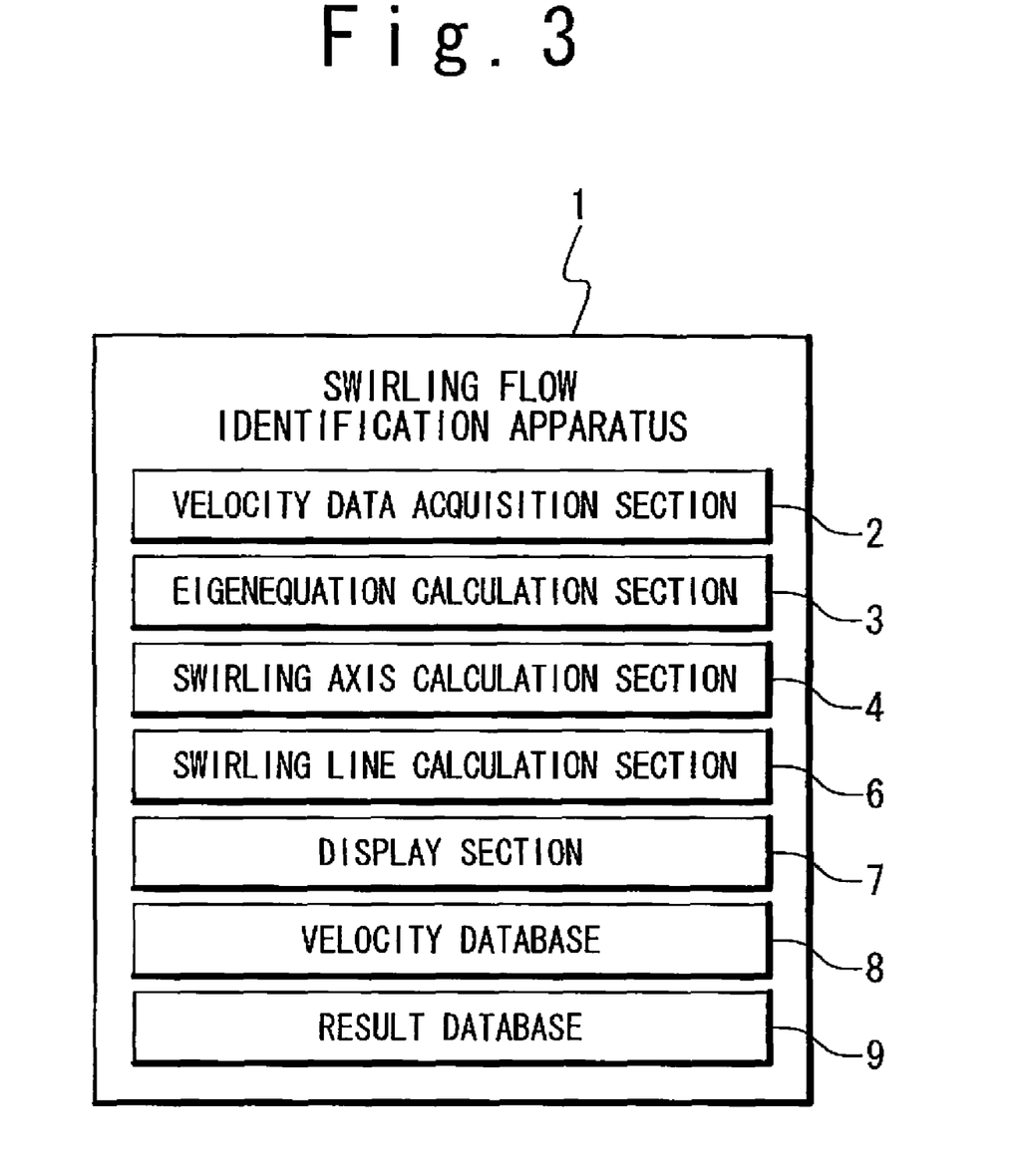
FIG. 3 is a block diagram showing the configuration of a swirling flow identification apparatus according to an embodiment of the present invention.

FIG. 3 is a block diagram showing the functional configuration of the swirling flow identification apparatus 1 according to the embodiment of the present invention. The swirling flow identification apparatus 1 is an information processing apparatus exemplified by a workstation or a personal computer. The swirling flow identification apparatus 1 includes: as programs, a velocity data acquisition section 2, an eigenequation calculation section 3, a swirling axis calculation section 4, a swirling line calculation section 6, and a display section 7. Further, the swirling flow identification apparatus 1 includes: as data and programs, a velocity database 8 and a result database 9. The velocity database 8 and the result database 9 may be integrated together.

The velocity data acquisition section 2, based on input of data related to a fluid, performs numerical analysis through Computational fluid Dynamics. Then, the velocity data acquisition section 2 calculates three-dimensional velocity vector data V ($V_1$, $V_2$, $V_3$) of the fluid at each of a plurality of three-dimensional coordinate points Xs ($X_1$, $X_2$, $X_3$) indicating the position in the fluid. The calculated data is stored into the velocity database 8, but it may be directly outputted to the eigenequation calculation section 3.

The velocity data V ($V_1$, $V_2$, $V_3$) of this fluid at each of the plurality of coordinate points Xs ($X_1$, $X_2$, $X_3$) may be acquired from a storage unit (not shown) connected to the swirling flow identification apparatus 1 via a communication line (not shown) or from another apparatus (not shown) on the network. Either of the storage unit (not shown) and the another apparatus (not shown) are other than the swirling flow identification apparatus 1. In this case, the another apparatus (not shown) may have the function of the velocity data acquisition section 2 or may be a simulation apparatus concerned with fluid flow (for example, a simulation apparatus for ship, wind power generator, turbine, fluid machinery, aircraft, chemical plant or atomic power plant).

The velocity database 8 stores, in correspondence with the coordinate point X, the velocity data V calculated by the velocity data acquisition section 2. The velocity database 8 may store, in correspondence with the coordinate point X, the velocity data V acquired from the storage unit (not shown) or the another apparatus (not shown) on the network.

The eigenequation calculation section 3 acquires the velocity data V in correspondence with the coordinate point X from the velocity data acquisition section 2 or the velocity database 8. The eigenequation calculation section 3, based on the velocity data V of the fluid at the coordinate points Xs, calculates eigenvalue $\lambda$ and eigenvector $\xi$ ($\xi_1$, $\xi_2$, $\xi_3$) through eigenequation concerning the coordinate point X and the velocity data V. The coordinate point X and the velocity data V are three-dimensional data; thus, for the eigenvalue $\lambda$, three values ($\lambda_1$, $\lambda_2$, $\lambda_3$) are calculated. The calculation results are outputted to the swirling axis calculation section 4.

The swirling axis calculation section 4, if the eigenvalue $\lambda$ is a complex number expressed by $\lambda_R \pm i\phi$ (where is the imaginary number), defines the imaginary part $\phi$ of the complex number $\lambda_R \pm i\phi$ as a swirl function $\phi$. The swirling axis calculation section 4 calculates a coordinate point $X_0$ where the swirl function $\phi$ ($X_1, X_2, X_3$) takes a local maximum value $\phi_0$. This coordinate point $X_0$ is defined as the position of a swirling axis P of a swirling flow in the fluid.

The swirling axis calculation section 4 further calculates the local maximum value $\phi_0$ in the swirl function $\phi$, and defines the local maximum value $\phi_0$ as an angular velocity at the swirling axis P. These eigenvalue $\lambda$, eigenvector $\xi$, swirl function $\phi$, local maximum value $\phi_0$=angular velocity, and position $X_0$ of the swirling axis P are stored into the result database 9.

The result database 9 stores, in correspondence with the coordinate point X and the velocity data, the eigenvalue $\lambda$ and eigenvector $\xi$ calculated by the eigenequation calculation section 3, the swirl function $\phi$ and the position $X_0$ of the swirling axis P calculated by the swirling axis calculation section 4, and the local maximum value $\phi_0$=angular velocity calculated by the angular velocity calculation section 5.

The swirling line calculation section 6, based on the eigenvector $\xi$ and the swirl function $\phi$, calculates a swirling line S indicating the swirling flow. The calculation results are outputted to the display section 7. The display section 7, based on the calculation results, displays the swirling line S on a display.

Figure 4:
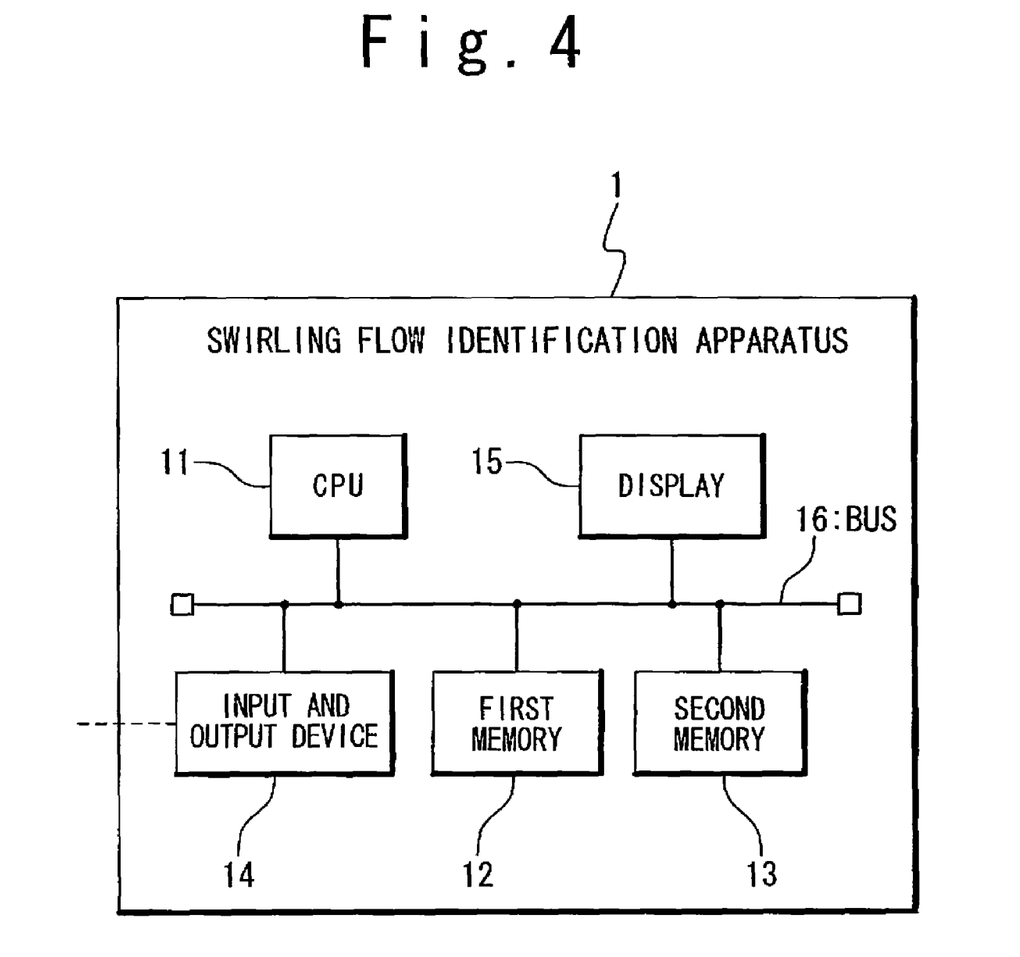
FIG. 4 is a block diagram showing a hardware configuration of the swirling flow identification apparatus according to the embodiment of the present invention.

FIG. 4 is a block diagram showing the hardware configuration of the swirling flow identification apparatus according to the embodiment of the present invention. The swirling flow identification apparatus 1 includes: a CPU (Central Processing Unit) 11, a first memory 12, a second memory 13, an input and output device 14, and a display 15, which are connected together via a bus 16.

The velocity data acquisition section 2, the eigenequation calculation section 3, the swirling axis calculation section 4, the swirling line calculation section 6, the display section 7, the velocity database 8, and the result database 9 described above are stored in the second memory 13 exemplified by a hard disk (HDD). Of these sections, the velocity data acquisition section 2, the eigenequation calculation section 3, the swirling axis calculation section 4, the swirling line calculation section 6, and the display section 7 are, upon operation of the swirling flow identification apparatus 1, loaded to the first memory 12 exemplified by a random access memory (RAM) and executed by the CPU 11. The CPU 11 reads the data properly from the velocity database 8 and the result database 9 and also writes the data properly thereinto. When necessary, inputting (including inputting from the external device via the communication line) from the input and output device 14 exemplified by a communication port or a keyboard is performed.

This swirling flow identification apparatus may be included in part of a simulation apparatus concerned with fluid flow. The swirling flow identification apparatus enables the more adequate recognition of the position and angular velocity of the swirling flow, and enables the improvement in the accuracy of simulation concerned with fluid flow. The simulation apparatus is exemplified by a ship, wind power generator, turbine, fluid machinery, aircraft, chemical plant or atomic power plant.

Figure 5:
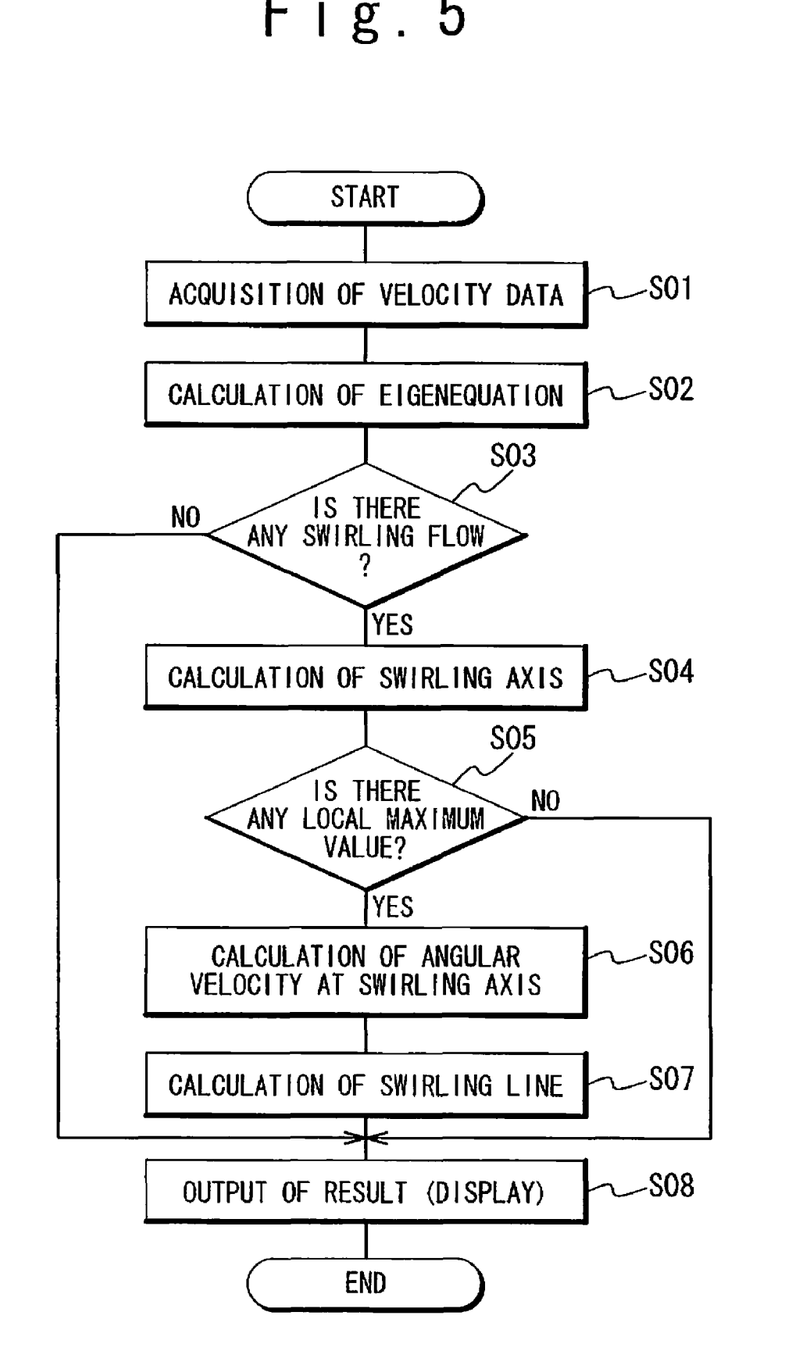
FIG. 5 is a flow diagram showing operation of the swirling flow identification apparatus according to the embodiment of the present invention.

Next, operation of the swirling flow identification apparatus according to the embodiment of the present invention will be described. FIG. 5 is a flow diagram showing the operation of the swirling flow identification apparatus according to the embodiment of the present invention.

(1) Step S01

The velocity data acquisition section 2 performs a numerical analysis on a predetermined fluid through computational fluid dynamics. The velocity data acquisition section 2 calculates, through the numerical analysis, three-dimensional velocity vector data V ($V_1$, $V_2$, $V_3$) of the fluid at each of a plurality of three-dimensional coordinate points Xs ($X_1$, $X_2$, $X_3$) indicating the position in the fluid. The calculated data is outputted to the eigenequation calculation section 3. The velocity data acquisition section 2 may receive the results of numerical analysis from the storage unit (not shown) and output them to the eigenequation calculation section 3.

(2) Step S02

The eigenequation calculation section 3 acquires the velocity data V of the fluid for each of the plurality of coordinate points Xs in the fluid. For each of the plurality of coordinate points Xs, the eigenequation calculation section 3 prepares the following eigenequation (1), and calculates it. Note that, upon the calculation, condition of continuity of the fluid expressed by equation (2) is added.

$$\det \left| \frac{\partial v_i}{\partial x_j} - \lambda \delta_{ij} \right| = 0, \text{ and} \quad (1)$$

$$\frac{\partial v_i}{\partial x_i} = 0, \quad (2)$$

where $V_i$: velocity component of velocity data V (i=1, 2, 3), $X_j$: coordinate component of coordinate point X (j=1, 2, 3), $\lambda$: eigenvalue, and $\sigma_{ij}$: Kronecker delta, which is 1 if i=j, and 0 otherwise.

The calculation provides the solution as follows:

$$x = \sum_{j=1}^{3} c_j e^{\lambda \xi} \xi^{(j)}, \quad (3)$$

where $X = (X_1, X_2, X_3)$, $c_j \in R$: constant (j=1, 2, 3), $\lambda_j$: calculated eigenvalue $\lambda$ (j=1, 2, 3), and $\xi^{(j)} = (\xi^{(j)}_1, \xi^{(j)}_2, \xi^{(j)}_3)$: calculated eigenvector $\xi$ (j=1, 2, 3).

(3) Step S03

In the equation (3), the three eigenvalues $\lambda$ ($\lambda_j$ (j=1, 2, 3)) apply to either of two possible cases: (i) where all of them are real numbers, and (ii) one of them is an real number while the other two are complex numbers.

For each of the plurality of coordinate points Xs in the fluid, it is decided in the case (i) that a swirling flow, in which the fluid near the coordinate point participates, is absent and it is decided in the case (ii) that the swirling flow is present.

Then, if all the plurality of coordinate points Xs apply to the case (i) (No in step S03), the processing proceeds to step S08. In the other case (Yes in step S03), the processing proceeds to step 04 for the coordinate point X that applies to (ii).

(4) Step S04

In the case (ii), the eigenvalue $\lambda$ is expressed as follows:

$$\lambda_1, \lambda_2 = \lambda_R \pm i\phi \quad (4), \text{ and}$$

$$\lambda_3 = \lambda_{axis} \quad (5),$$

where $\phi = \phi(X_1, X_2, X_3)$ $= \phi(r, \theta, z)$ (cylindrical coordinate system)>0, and i: imaginary number.

The swirling axis calculation section 4 defines the imaginary part $\phi$ of the complex number $\lambda_R \pm i\phi$ as the swirl function $\phi$. The swirling axis calculation section 4 calculates the coordinate point $X_0$ ($X_{10}$, $X_{20}$, $X_{30}$)=$\phi$ ($r_0$, $\theta_0$, $z_0$) where the swirl function $\phi$ ($X_1$, $X_2$, $X_3$)=$\phi$ (r, $\theta$, z) (cylindrical coordinate system) takes the local maximum value $\phi_0$. The method of calculating the coordinate point $X_0$ is exemplified by a method of calculating it from a change in the derivative of the swirl function $\phi$ and a method of obtaining the maximum value of the swirl function $\phi$. The swirling axis calculation section 4 defines the coordinate point $X_0$ as the position of the swirling axis P of the swirling flow in the fluid.

Here, if there are a plurality of coordinate points where the swirl function takes local maximum value, the swirling axis calculation section 4 decides that a plurality of swirling flows are present. Then, the swirling axis calculation section 4 defines each of the plurality of coordinate points where the swirl function takes local maximum value as each of positions of a plurality of swirling axes P1, P2, and so on corresponding to the plurality of swirling flows.

(5) Step S05

If there is no clear local maximum value, the swirling axis calculation section 4 decides that there is a swirling flow (a forced swirling flow) which has no clear swirling axis (vortex axis). Here, the clear local maximum value is a local maximum value that satisfies predetermined criterion. The predetermined criterion is exemplified by, for example, that a difference between the local maximum value and the average value is equal to or larger than a predetermined value. If there is no clear local maximum value (No in step S05), the processing proceeds to step S08. In the other case (Yes in step S05), the processing proceeds to step 06 below.

(6) Step S06

The swirling axis calculation section 4 further calculates the local maximum value $\phi_0$ in the swirl function $\phi$. For example, if the coordinate point $X_0$ is obtained from the change in the derivative of the swirl function $\phi$, the local maximum value $\phi_0$ can be calculated by substituting the components of the coordinate point $X_0$ to the swirl function $\phi$. If the coordinate point $X_0$ is obtained from the maximum value of the swirl function $\phi$, the maximum value serves as the local maximum value $\phi_0$. The swirling axis calculation section 4 defines the local maximum value $\phi_0$ as the angular velocity at the swirling axis P. If there are the plurality of swirling axes P1, P2, and so on, the swirling axis calculation section 4 calculates the local maximum values and defines the angular velocities in the same manner for these swirling axes.

These eigenvalue $\lambda$, eigenvector $\xi$, swirl function $\phi$, local maximum value $\phi_0$=angular velocity, and position $X_0$ of the swirling axis P are stored into the result database 9.

(7) Step S07

The swirling line calculation section 6, based on the eigenvector $\xi$ and the swirl function $\phi$, calculates the swirling line S indicating the swirling flow.

If the eigenvalues $\lambda_1$ and $\lambda_2$ are complex numbers (equation (4)), the eigenvectors $\xi^{(1)}$ and $\xi^{(2)}$ corresponding to the eigenvalues $\lambda_1$ and $\lambda_2$ are also complex numbers. The eigenvector $\xi$ is expressed as follows:

$$\xi^{(1)}, \xi^{(2)} = \xi_{plane} \pm i\eta_{plane} \quad (6), \text{ and}$$

$$\xi^{(3)} = \xi_{axis} \quad (7),$$

where i: imaginary number.

Substituting the eigenvalue λ expressed by the equations (4) and (5) and the eigenvector ξ expressed by the equations (6) and (7) into the equation (3) yields the swirling line S (locus of the coordinate point X) expressed as follows. If there are the plurality of swirling axes P1, P2, and so on, their swirling lines S1, S2, and so on are calculated in the same manner.

$$x = 2e^{2Rt}(\xi_{plane} \cos \phi t - \eta_{plane} \sin \phi t) + e^{2axis\,t}\xi_{axis} \quad (8),$$

where $c_j = 1$ (j=1, 2, 3)

(8) Step S08

The display section 7, based on results of the calculation in step S07, displays the swirling line S (S1, S2, and so on) on the display 15. Or, if all the plurality of coordinate points Xs apply to the case (i) in step S03, the display section 7 displays that no swirling flow exists. Or, if in the case of the swirling flow not having a clear swirling axis (vortex axis) in step S05, the display section 7 displays that no swirling axis exists.

The operation of the swirling flow identification apparatus according to the embodiment of the present invention is performed as described above.

Figure 6:
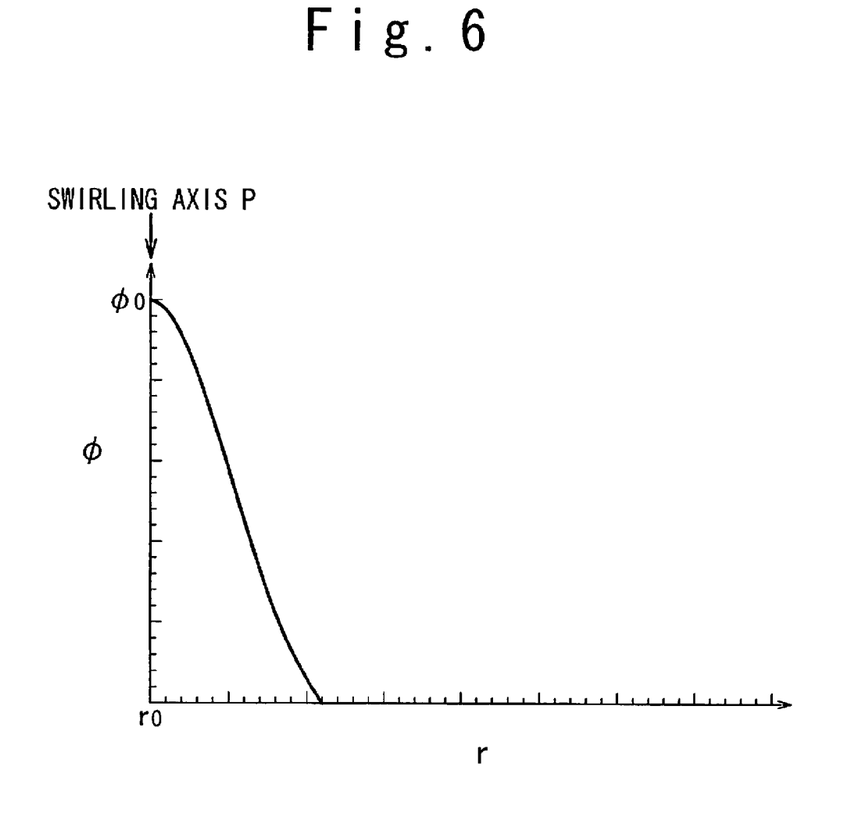
FIG. 6 is a graph showing results of analysis performed by the swirling flow identification apparatus according to the present invention on velocity data of the Burgers vortex.

FIG. 6 is a graph showing results of analysis performed by the swirling flow identification apparatus of the present invention on velocity data of the Burgers vortex. The vertical axis denotes the value of the swirl function $\phi$ (r, θ, z), and the horizontal axis denotes the value of r. The graph shows a change in the swirl function $\phi$ on a predetermined swirling plane (with z fixed) and in a predetermined direction (with $\phi$ fixed).

In this case, the $\phi$ takes the local maximum value $\phi_0$ at the position where $r=r_0$. That is, the position where $r=r_0$ is the position of the swirling axis P, and $\phi = \phi_0$ is the angular velocity at the swirling axis P. That is, in the present invention, the position of the swirling flow P is defined as $r_0$, and the angular velocity thereof is defined as $\phi_0$. It was confirmed that these position and angular velocity agree with values of Burgers vortex obtained as mathematically exact solutions.

It was also confirmed that the same results are observed at all the plurality of coordinate points Xs where the swirl function $\phi$ exists.

Figure 7:
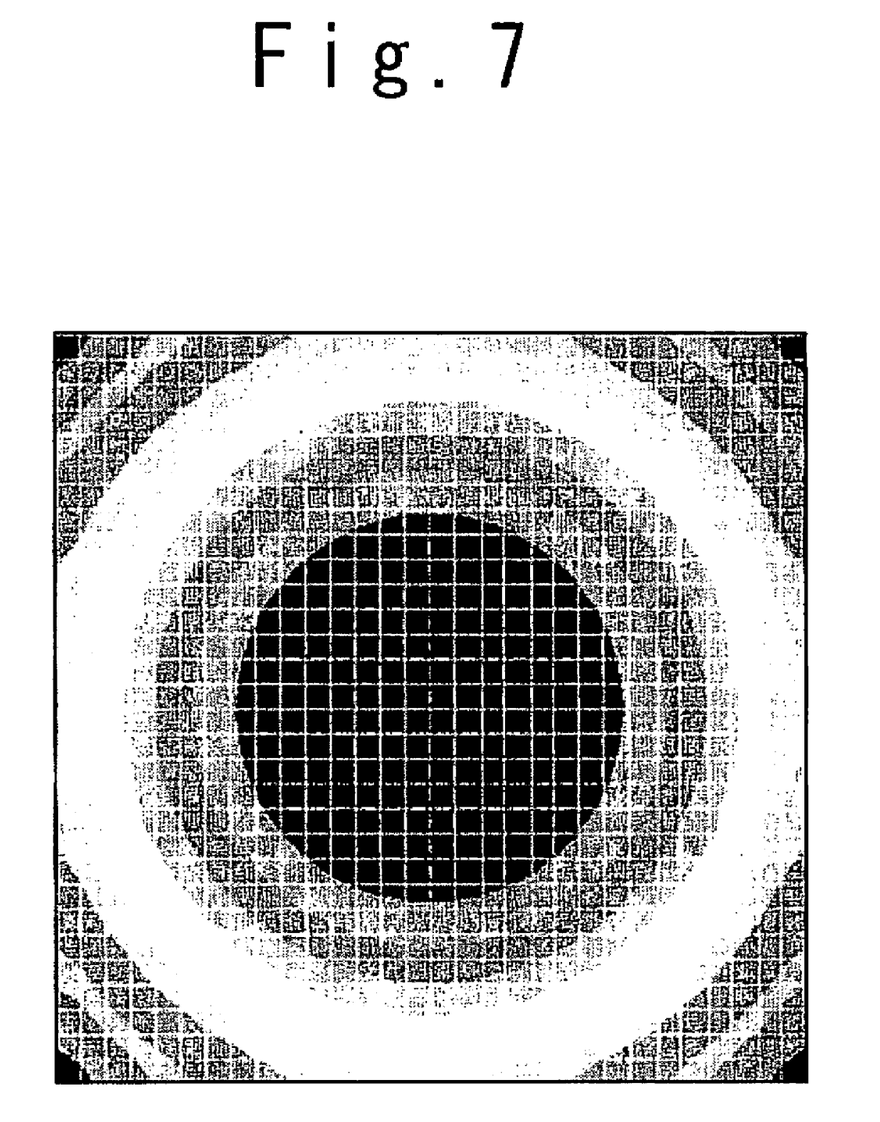
FIG. 7 is a diagram showing the graph of FIG. 6 as viewed from the direction of a swirling axis P.

FIG. 7 is a diagram showing the graph of FIG. 6 as viewed from a direction of the swirling axis P. Here, a darker color indicates larger swirl function $\phi$. The swirl function takes the local maximum value at the central part which corresponds to the position of the swirling axis P where $r=r_0$ in FIG. 6. That is, obtaining the distribution of values of the swirl function $\phi$ permits visually finding the position of the swirling axis with ease.

Figure 8:
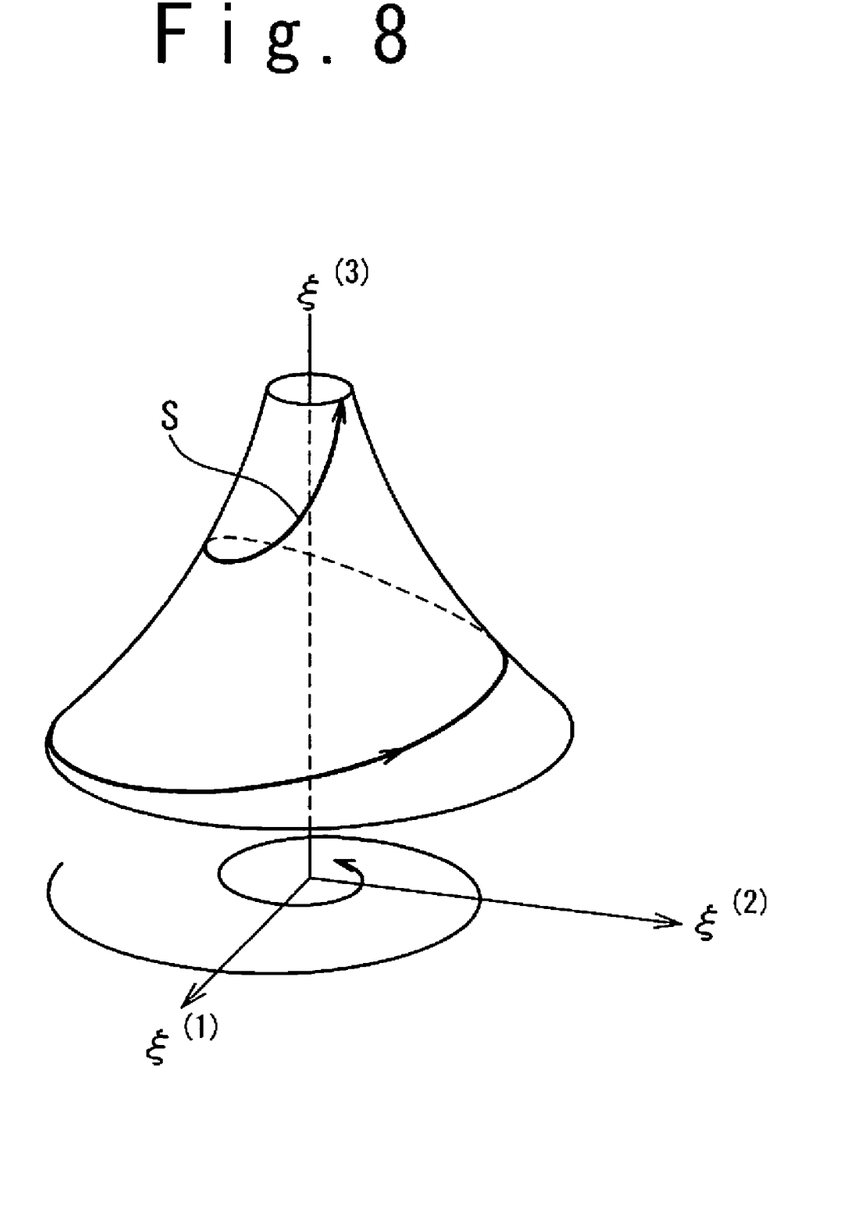
FIG. 8 is a graph showing another results of analysis performed by the swirling flow identification apparatus according to the present invention on the velocity data of the Burgers vortex.

FIG. 8 is a graph showing another result of analysis performed by the swirling flow identification apparatus of the present invention on the velocity data of the Burgers vortex. Three axes denote eigenvectors $\xi^{(1)}$, $\xi^{(2)}$, and $\xi^{(3)}$, respectively. The graph shows the swirling line S (the locus of the coordinate point X). This locus agrees with the value of the Burgers vortex obtained by another method conventionally known.

For the Burgers vortex that is well known as a vortex model in the field of fluid dynamics, the usability of the present invention has been proved as described above. That is, it has been theoretically proved that the eigenvalue is a complex number not only at the swirling axis but also around the swirling axis, and the imaginary part of the complex number of the eigenvalue takes a local maximum value at the swirling axis. The imaginary part is defined as the swirl function, and indicated as a physical quantity of angular velocity.

Figure 9:
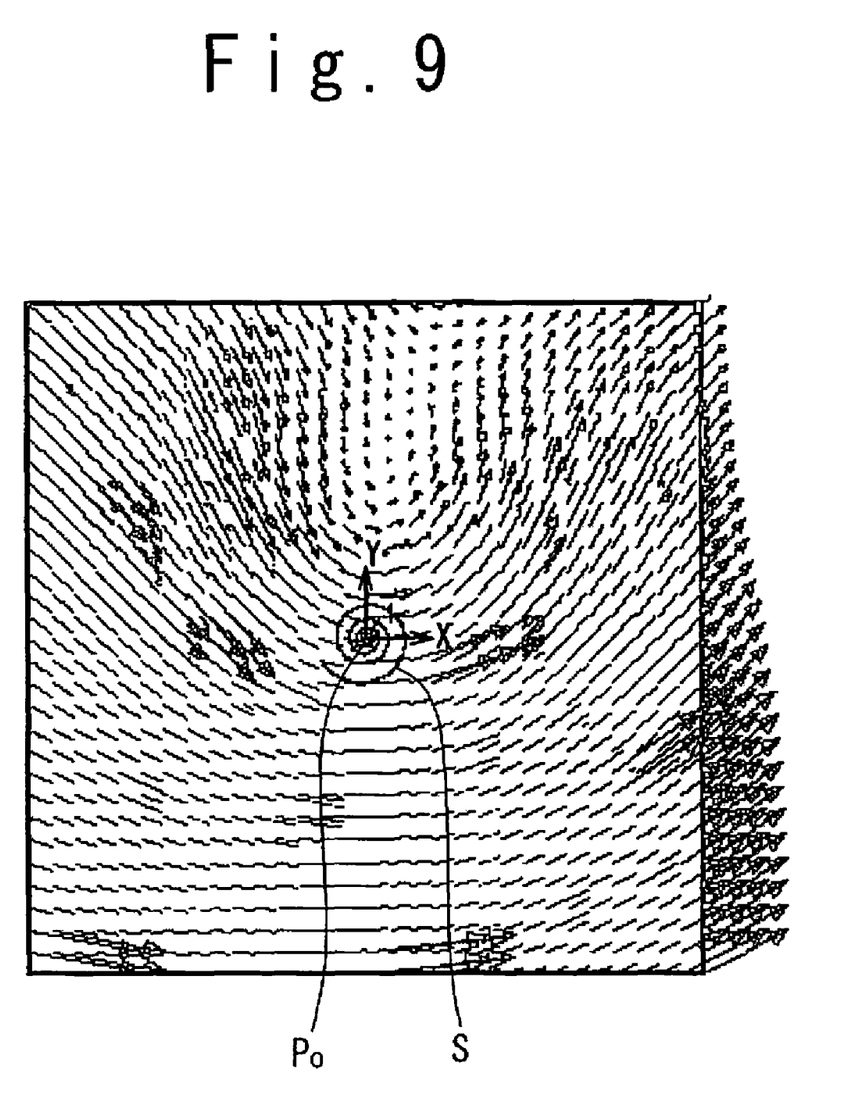
FIG. 9 is a diagram showing results of analysis performed by the swirling flow identification apparatus according to the present invention on the example of the fluid flow, shown in FIG. 2, in which the uniform flow is superimposed on the swirling flow.

The present invention is applicable not only to another Burgers vortexes but also to other typical flows, one example of which is shown in FIG. 9.

FIG. 9 is a diagram showing results of analysis performed by the swirling flow identification apparatus of the present invention on the example, shown in FIG. 2, of the fluid flow in the state in which the uniform flow is superimposed on the swirling flow. FIG. 2 shows the example of the fluid flow on the predetermined swirling plane. FIG. 9 shows a velocity vector at each of a plurality of node points (coordinate points) in a case where the uniform flow, which flows in the lateral direction from the left side to the right side of the figure, is superimposed on the swirling flow shown in FIG. 1. Then, in addition thereto, FIG. 9 shows the position of the swirling axis $P_0$ and the swirling line S in the swirling flow shown in FIG. 1. The position of swirling axis $P_0$ and swirling line S agree with those obtained by another method conventionally known.

As described above, the swirling flow identification apparatus of the present invention, even under the presence of a uniform flow besides a swirling flow (even under the condition that the velocity is not equal to 0 at the swirling axis P), is capable of properly identifying the position of the swirling axis $P_0$ and calculating the swirling line S of the swirling flow by the method of deciding the swirling axis P based on the local maximum value of the swirl function $\phi$, and is further capable of visually demonstrating this presence.

The present invention permits discrimination between a swirling flow having a clear swirling axis (vortex axis) and a swirling flow not having it (a forced swirling flow). If the swirling flow has a clear swirling axis, the swirl function exhibits convex distribution which is mountain-shaped with the swirling axis lying at the center, while the forced swirling flow does not have a local maximum of the swirl function at the swirling axis.

The present invention permits adequate calculation of the swirling flow through a relatively easy calculation method by using a velocity vector at each of node points (coordinate points) even under the presence of the another flow or the plurality of swirling flows.

The swirling flow identification apparatus and swirling flow identification method of the present invention can be used by being integrated into simulation of fluid flow concerned with ship, wind power generator, turbine, fluid machinery, aircraft, plant or the like. In this case, the position of the swirling flow and the angular velocity can be more adequately recognized, thus permitting improvement in the accuracy of simulation.

The invention claimed is:

1. A swirling flow identification apparatus comprising;
a microprocessor and a memory; said microprocessor of said swirling flow identification apparatus is programmed to implement:
an eigenequation calculation section which, based on velocity data of a fluid at a coordinate point, calculates an eigenvalue through an eigenequation concerning said coordinate point and said velocity data; and
a swirling axis calculation section which, if said eigenvalue is a complex number, defines an imaginary part of said complex number as a swirl function, calculates a coordinate point providing a local maximum value in said swirl function, and defines said coordinate point providing said local maximum value as a position of a swirling axis of a swirling flow in said fluid.

2. The swirling flow identification apparatus according to claim 1, wherein said swirling axis calculation section further calculates said local maximum value in said swirl function and defines said local maximum value as an angular velocity at said swirling axis.

3. The swirling flow identification apparatus according to claim 2, further comprising;
a swirling line calculation section which, based on an eigenvector and said swirl function calculated by said eigenequation, calculates a swirling line indicating said swirling flow; and
a display section which displays said swirling line.

4. The swirling flow identification apparatus according to claim 1, wherein said swirling axis calculation section further decides that said fluid has no swirling flow if said eigenvalue is other than a complex number.

5. The swirling flow identification apparatus according to claim 1, wherein said swirling axis calculation section further decides that said fluid has no swirling axis if said local maximum value does not satisfy a predetermined condition.

6. A flow simulation apparatus, comprising:
an analysis apparatus which, based on input of data related to a fluid, calculates velocity data at each of a plurality of coordinate points indicating a position in said fluid; and
said swirling flow identification apparatus according to claim 1.

7. A swirling flow identification method which is executed by a swirling flow identification apparatus including an eigenequation calculation section and a swirling axis calculation section, comprising:
based on a velocity data of a fluid at a coordinate point, calculating an eigenvalue through an eigenequation concerning said coordinate point and said velocity data;
if said eigenvalue is a complex number, defining an imaginary part of said complex number as a swirl function;
calculating, using a microprocessor, a coordinate point providing a local maximum value in said swirl function; and
defining said coordinate point providing said local maximum value as a position of a swirling axis of a swirling flow in said fluid,
wherein said eigenequation calculation section executes said calculating said eigenvalue, and
said swirling axis calculation section executes said defining said imaginary part, said calculating said coordinate point and said defining said coordinate point.

8. The swirling flow identification method according to claim 7, further comprising:
calculating said local maximum value in said swirl function; and
defining said local maximum value as an angular velocity at said swirling axis,
wherein said swirling axis calculation section executes said calculating said local maximum value and said defining said local maximum value.

9. The swirling flow identification method according to claim 7, further comprising:
calculating a swirling line indicating said swirling flow based on an eigenvector and said swirl function calculated through said eigenequation; and
displaying said swirling line.

10. A computer-readable medium having code stored thereon, which when executed by a processor implements:
based on a velocity data group of a fluid at a coordinate point group, calculating an eigenvalue through an eigenequation concerning said coordinate point group and said velocity data group;
if said eigenvalue is a complex number, defining an imaginary part of said complex number as a swirl function;
calculating a coordinate point providing a local maximum value in said swirl function; and
defining said coordinate point providing said local maximum value as a position of a swirling axis of a swirling flow in said fluid.

11. The computer-readable medium according to claim 10, wherein said coordinate point group includes a plurality of coordinate points,
said velocity data group includes a plurality of velocity data,
said calculating said eigenvalue comprises:
based on said velocity data group of said fluid at said coordinate point group, calculating an eigenvalue through an eigenequation concerning said one of said plurality of coordinate points and one of said plurality of velocity data at said one of said plurality of coordinate points for each of said plurality of coordinate points,
said defining said imaginary part comprises:
for each of said plurality of coordinate points, if said eigenvalue is a complex number, defining an imaginary part of said complex number as a swirl function;
said calculating said coordinate point comprises;
for each of said plurality of coordinate points, calculating said coordinate point providing a local maximum value in said swirl function,
said defining said coordinate point comprises;
if there are a plurality of coordinate point each of which provides a local maximum value in said swirl function, defining each of said plurality of coordinate point as a position of a swirling axis of a swirling flow in said fluid.

12. The computer-readable medium according to claim 10, further comprises:
calculating said local maximum value in said swirl function; and
defining said local maximum value as an angular velocity at said swirling axis.

13. The computer-readable medium according to claim 10, further comprising:
calculating swirling line indicating said swirling flow based on an eigenvector and said swirl function calculated through said eigenequation; and
displaying said swirling line.

14. The computer-readable medium according to claim 10, further comprising:
deciding that said fluid has no swirling flow if said eigenvalue is other than a complex number.

15. The computer-readable medium according to claim 10, further comprising;
deciding that said fluid has no clear swirling axis if said local maximum value does not satisfy a predetermined condition.

16. The computer-readable medium according to claim 10, further comprises:
based on input of data related to said fluid, calculating said velocity data group at said coordinate point group,
wherein said coordinate point group indicates a position group in said fluid.

* * * * *